May 6, 1930. C. A. KLOPFER 1,757,051
APPARATUS FOR THE REGULATION OF COMBUSTION IN FURNACES
Filed March 14, 1928
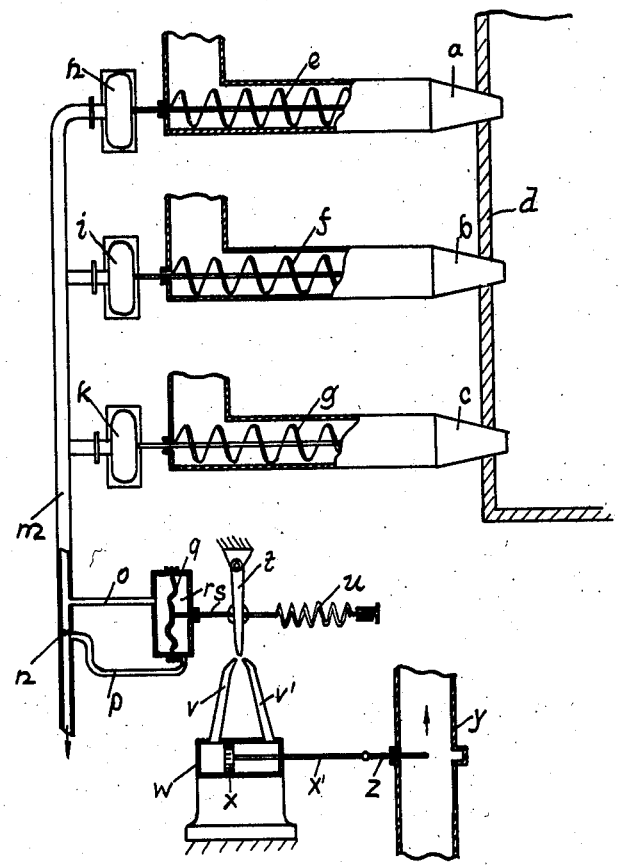
Inventor:
Carl Albert Klopfer Patented May 6, 1930

1,757,051

UNITED STATES PATENT OFFICE

CARL ALBERT KLOPFER, OF BERLIN-STEGLITZ, GERMANY, ASSIGNOR TO ASKANIA-WERKE AKTIENGESELLSCHAFT VORMALS CENTRALWERKSTATT DESSAU UND CARL BAMBERG-FRIEDENAU, OF BERLIN-FRIEDENAU, GERMANY

APPARATUS FOR THE REGULATION OF COMBUSTION IN FURNACES

Application filed March 14, 1928, Serial No. 261,571, and in Germany March 16, 1927.

This invention relates to the regulation of combustion in furnaces to which the fuel is supplied by a plurality of separate feed devices, for example multiple-burner coal-dust consuming furnaces. In these furnaces the regulation of the air supply has hitherto depended upon the number of revolutions of the common driving shaft of a single fuel delivery or conveying device. Such a process however provides a perfect regulation only when each conveyer device supplies an identical quantity of fuel to the burners or the like, while when the conveyer devices are differently set or when some of them are idle, there is the inherent disadvantage that the number of revolutions of the common driving shaft does not provide a properly proportionate measure for the total quantity of fuel, so that too much or too little combustion air is supplied, and an uneconomical combustion ensues. According to the present invention, this disadvantage is eliminated by employing for the regulation of the combustion air a measuring value which always corresponds to the sum total of the fuel supplied by the single conveyer devices, so that when this measuring value acts on a regulating device of any desired kind, the quantity of the combustion air supplied is regulated in such a manner that it is always in the same ratio to the sum total of the fuel. The proportion of carbonic acid in the waste gases therefore always assumes the desired value, and an economical complete combustion is ensured. The measuring value corresponding to the total fuel quantity may be obtained for instance by arranging at each single fuel conveying device a measuring fan or a liquid pump, the delivery of which is in communication with a common collector pipe. The quantity of air or liquid flowing through the collector pipe, then gives directly a measurement for the total quantity of fuel and may be utilized for controlling any desired regulating device for the combustion air.

The drawing shows diagrammatically by way of example a construction according to the invention for firing a furnace with coal dust.

In the drawings, $a$, $b$ and $c$ are three burners opening into a common combustion chamber $d$, the coal dust constituting the fuel being delivered to the said burners in a well known manner by worm conveyers $e$, $f$ and $g$. The worm conveyers $e$, $f$ and $g$ are rotated in any desired known manner either singly or from a common driving shaft. The spindles of the conveyer worms $e$, $f$ and $g$ are coupled according to the invention each to a measuring fan $h$, $i$ and $k$, the delivery pipes of which are connected to a common collector pipe $m$. The quantity of air flowing through the collector pipe $m$, therefore provides directly a measure for the sum total of coal dust supplied to the burners $a$, $b$ and $c$. In the collector pipe is produced by means of a throttling edge $n$ or the like, a difference of pressure which is transmitted through pipes $o$ and $p$, to the diaphragm $q$ of a differential pressure gauge $r$. The diaphragm $q$ is connected by a rod $s$ to a jet pipe $t$ constantly emitting compressed air or other pressure medium, on which pipe $t$ the pressure of the spring $u$ acts at the opposite side. Under the outlet orifice of the jet pipe $t$ are arranged the nozzle shaped openings of two pipes $v$ and $v'$ which lead to the opposite ends of a cylinder $w$. In the cylinder $w$ slides a piston $x$, the piston rod $x'$ of which is connected to a throttle valve $z$ mounted in the supply pipe $y$ for the combustion air. The pressure difference acting on the diaphragm $q$ of the differential pressure gauge $r$ is dependent on the quantity of air passing through the collector pipe $m$, and when this quantity changes, it produces a deflection of the diaphragm $q$ in one or other direction, the jet pipe $t$ being turned about an axis at right angles to its longitudinal direction.

Owing to this, a greater quantity of compressed air or the like will pass to one side of the piston $x$ than to the other side, so that the piston $x$ will be moved to the right or to the left, and at the same time will close or open the valve $z$ to a greater extent. The quantity of the combustion air supplied to the furnace, will therefore be modified, this modification taking place in dependence on the quantity of air passing through the collector pipe $m$, and therefore in dependence on the total quantity of fuel supplied to the burners a, b and c, so that the ratio between the total of the fuel and the quantity of the combustion air supplied, will always retain the same value independently of the setting of the single burners, and a perfect combustion will be ensured.

The invention is not limited of course to the construction illustrated, on the contrary the measuring value which gives the measure for the total quantity of fuel, may be obtained also in other ways, for instance by liquid pumps or the like coupled to the fuel supply devices. The manner in which the measuring value acts on the device used for the regulation of the combustion air, may also be of any desired kind, for example in place of a throttle in the collector pipe, there may be provided a capillary pipe or the like. The invention is of course applicable not only to coal dust furnaces, but can be used in a corresponding manner for instance also in coal furnaces with several travelling grates or in travelling grates with coal worms and in furnaces which burn liquid fuels.

I claim:—

1. An apparatus for the regulation of combustion in furnaces comprising in combination a plurality of burners; a plurality of feed devices supplying the fuel to said burners; a plurality of means each controlled by one of the feed devices in accordance with the quantities of fuel supplied by them and producing a regulating effect; and regulating means for the combustion controlled by the total effect produced by said first mentioned means.

2. An apparatus for the regulation of combustion in furnaces comprising in combination a plurality of burners; a plurality of feed devices supplying the fuel to said burners; a plurality of measuring pumps, each controlled by one of the feed devices in accordance with the quantities of fuel supplied by them, delivering into a common collector pipe, and regulating means for the combustion controlled by the total delivery of said pumps.

3. An apparatus for regulating furnaces comprising at least two burners; a fuel feed device in each burner for supplying fuel to the furnace; a measuring pump for each burner operated by the respective feed device depending upon the amount of fuel passing through the burner; a collector pipe for receiving the fluid exhausting from the pumps; and a regulator for the combustion air for the furnace controlled by the fluid from the pumps.

4. An apparatus for regulating furnaces comprising at least two burners; a fuel feed device in each burner for supplying fuel to the furnace; a measuring pump for each burner operated by the respective feed device depending upon the amount of fuel passing through the burner; a collector pipe for receiving the fluid exhausting from the pumps; and a regulator for the combustion air for the furnace controlled by the fluid from the pumps, said regulator comprising a diaphragm-controlled nozzle actuating a control for the combustion air.

5. An apparatus for regulating furnaces comprising at least two burners; a fuel feed device in each burner for supplying fuel to the furnace; a measuring pump for each burner operated by the respective feed device depending upon the amount of fuel passing through the burner; a collector pipe for receiving the fluid exhausting from the pumps; and a regulator for the combustion air for the furnace controlled by the fluid from the pumps, said regulator comprising a diaphragm-controlled nozzle actuating a piston control for the combustion air.

In testimony whereof I affix my signature.

CARL ALBERT KLOPFER.

DISCLAIMER 1,757,051.—*Carl Albert Klopfer*, Berlin-Steglitz, Germany. APPARATUS FOR THE REGULATION OF COMBUSTION IN FURNACES. Patent dated May 6, 1930. Disclaimer filed July 15, 1932, by the assignee, *Askania-Werke Aktiengesellschaft vormals Centralwerkstatt Dessau und Carl Bamberg-Friedenau.*

Hereby disclaims claim 1, which is in the following words, to wit:

"An apparatus for the regulation of combustion in furnaces comprising in combination a plurality of burners; a plurality of feed devices supplying the fuel to said burners; a plurality of means each controlled by one of the feed devices in accordance with the quantities of fuel supplied by them and producing a regulating effect; and regulating means for the combustion controlled by the total effect produced by said first mentioned means."

[*Official Gazette August 9, 1932.*]